No. 727,077. PATENTED MAY 5, 1903.
F. H. BROWN.
APPARATUS FOR LOCATING METALS, MINERALS, BURIED TREASURES, &c. WITHOUT DIGGING.
APPLICATION FILED FEB. 28, 1902.
NO MODEL. 2 SHEETS—SHEET 1.
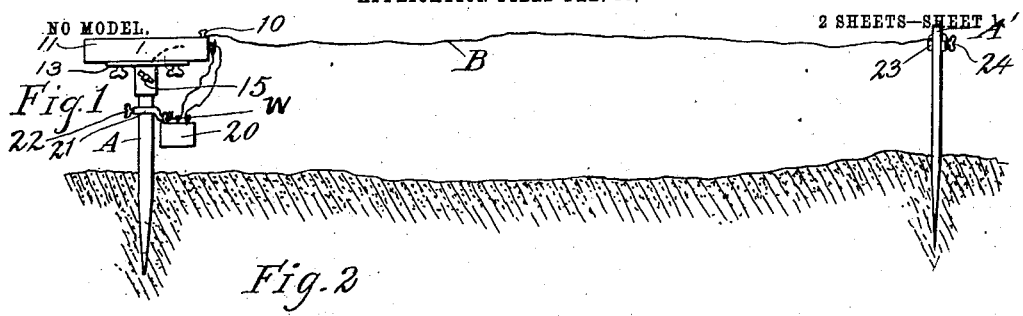
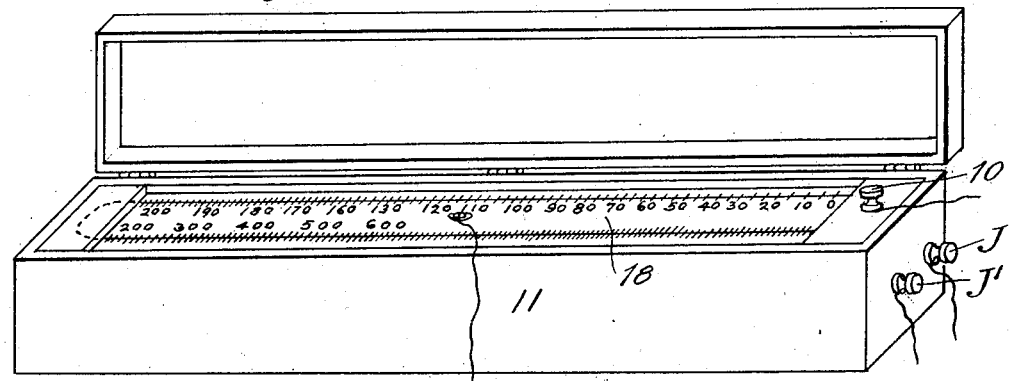
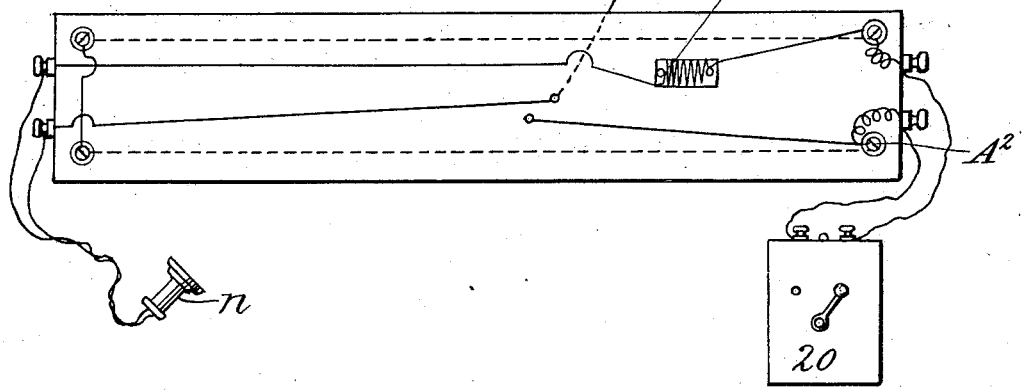
Witnesses
B. W. Piercy
E. F. Lewys
Inventor
Fred Harvey Brown
by James R. Rogers
Attorney No. 727,077. PATENTED MAY 5, 1903.
F. H. BROWN.
APPARATUS FOR LOCATING METALS, MINERALS, BURIED TREASURES, &c. WITHOUT DIGGING.
APPLICATION FILED FEB. 28, 1902.
NO MODEL. 2 SHEETS—SHEET 2.
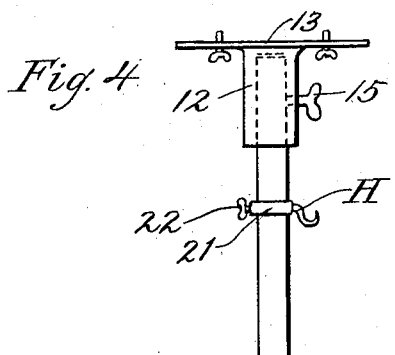
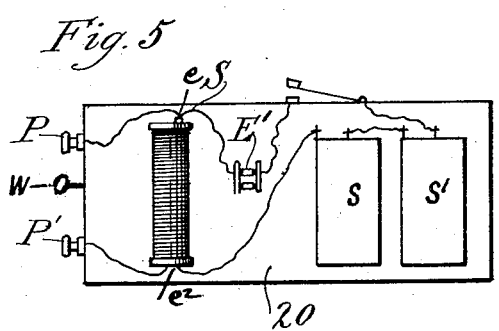
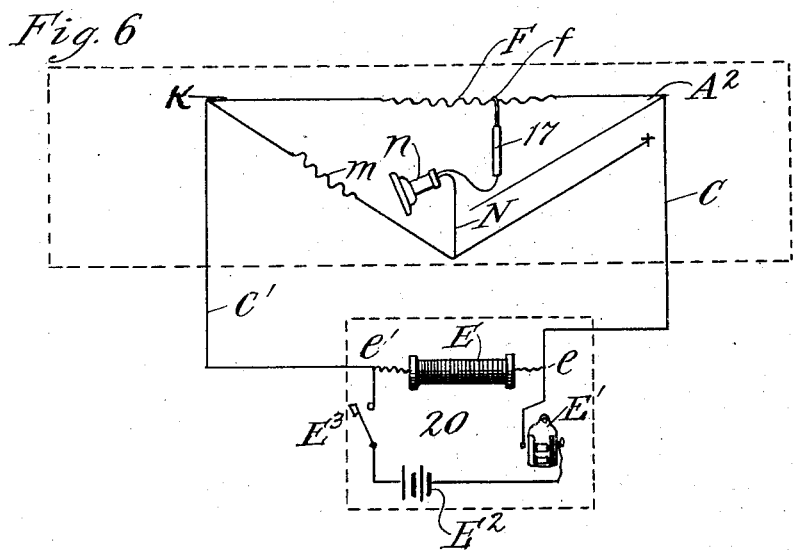
Witnesses
B. W. Pierce
E. F. Lewis
Inventor
Fred Harvey Brown
by James R. Rogers
Attorney No. 727,077.                                                        Patented May 5, 1903.

UNITED STATES PATENT OFFICE.

FRED HARVEY BROWN, OF LOS ANGELES, CALIFORNIA.

APPARATUS FOR LOCATING METALS, MINERALS, BURIED TREASURES, &c., WITHOUT DIGGING.

SPECIFICATION forming part of Letters Patent No. 727,077, dated May 5, 1903.

Application filed February 28, 1902. Serial No. 96,180. (No model.)

*To all whom it may concern:*

Be it known that I, FRED HARVEY BROWN, a citizen of the United States, residing at Los Angeles, in the county of Los Angeles and State of California, have invented and discovered a new and useful Apparatus for Locating Metals, Minerals, Buried Treasures, and Like Substances without Digging, of which the following is a specification.

This invention relates to apparatus for locating minerals, metals, and ores.

Some of the objects of the invention are to provide an apparatus of simple construction and arrangement of its parts, by which arrangement the practical use and application of my device in the field enables the operator to perform a given amount of survey of the earth measurements in less time and with less work than any previous device heretofore used.

Another object is to construct the apparatus with reference to the combination of its individual parts so as to eliminate complexity in its construction and to enable one to manufacture them more readily.

A further object of my invention is to so arrange its construction as to make it possible to set up the apparatus in the field ready for work with more ease and in less time than has been heretofore possible on steep and precipitous mountains when the apparatus has been mounted on a tripod.

Still another object of my invention is to eliminate the necessity of using two wires over the field, as has been heretofore the case, and to so construct my apparatus in the relative arrangement of its parts in such a manner as to make it possible to perform the same work in less time and with less labor than has been heretofore possible in devices generally used in this art, wherein two wires have been attached to an instrument and adapted to be extended over the field to remote places.

The invention consists, substantially, in the construction, combination, location, and relative arrangements of its parts, as will be more fully and hereinafter particularly described, and shown in the accompanying drawings.

I attain these objects by devices illustrated in the accompanying drawings, in which—

Figure 1 is a view in diagram of a part of the apparatus employed in carrying out my invention, showing the fixed and movable terminals and the electric measuring-wire connected to the same. Fig. 2 is a view in perspective of the resistance-box, the lid open, illustrating the three binding-posts, stylus, and wire connections. Fig. 3 is a plan of the bottom of the resistance-box shown in Fig. 2 with the telephone-receiver, stylus, connecting-wires, and box closed, containing the batteries, rheotome, magnetic coil, and connections. Fig. 4 is a view in elevation of the fixed terminal to be attached to the resistance-box containing the Wheatstone bridge. Fig. 5 is a view in elevation of the box containing two dry batteries, rheotome, electric magnetic coil, and electric connections; and Fig. 6 is a diagrammatic view showing the resistance and battery boxes in dotted lines and the electric circuits.

Similar letters, numerals, and signs refer to like parts throughout the various views of the drawings.

In the drawings, Fig. 1, the reference-letter B indicates the electric measuring-wire, and the letters A and A' designate metallic rods of suitable contact materials—such as brass, polished iron, or like substances—pointed at their ends, adapted to be inserted into the earth. The rod A is firmly and detachably attached to a brass socket 12 by the thumb-screw 15, which forms a part of the brass plate 13, attached to the resistance-box 11 at or about the longitudinal and cross center thereof by means of the said plate 13, which in turn is internally connected by wires and completing the circuit at a point designated by $A^2$, as shown upon Fig. 6 of the drawings. The rod A is also in circuit with the wires C C', which are superimposed on and in series with the windings of the electromagnet E, the rheotome E', the battery $E^2$, and the shunt or switch $E^3$, as shown in Fig. 6. I include in one branch of the Wheatstone bridge the high-resistance wire F, Figs. 3 and 6. One branch of the bridge contains the resistance-coil $m$, which has a fixed resistance interposed in it, and the bridge portion N includes suitable signaling or indicating device, as a telephone-receiver. I superimpose upon this circuit at points where the primary wires from the battery $E^2$, composed of the two cells S S', pass into and out of the coil, as shown at $e\,e'$, the two wires connected to the binding-posts P and P'. The interruption of the rheotome E' generates extra direct electrical impulses, which pass out of the box through the binding-posts P P'. (See Fig. 5 of the drawings.) The binding-posts J J' on end of box, as shown upon Fig. 2 of the drawings, are connected with the branches of the bridge inside of the resistance-box 11 at the points designated at $A^2$ and K, Fig. 6. The plate 13, the socket 12, and rod A (shown in Fig. 4) are also connected inside of the resistance-box at the point $A^2$ with the bridge-wires.

The battery-box 20, as shown in Fig. 5, has a screw-eye W attached to it, which adapts it to be hung on the hook H after the rod A is inserted into the earth and forms the base and standard for the Wheatstone-bridge box. In Fig. 1 I have shown a clamp 23, with a thumb-screw 24, adapted to hold the connecting-wire B to the rod A'. In the same figure I have illustrated a clamping-ring 21, with a hook H made integral therewith, and a thumb-screw 22 for securing said clamping-ring 21 to the rod A. Upon the hook H, I suspend the battery-box 20.

When the resistance of the earth between the fixed terminal A and the movable terminal A' is equal to the resistance of that portion of the resistance-wire F between the point of contact of the stylus 17, as shown at $f$, and the point on the same wire marked $A^2$, (the resistance of the other two branches being equal,) then no current will traverse the bridge portion N and no sound or other signal will be produced in the receiver $n$. If, however, the relative resistance of the rheostat and of the circuit of the earth between the fixed rod A and the movable rod A' is varied, then the electrical equilibrium of the bridge is disturbed and a signal will be given in the telephone-receiver in the branch N of the bridge, and by moving this stylus 17 back and forth over the high-resistance wire F until equilibrium is again established, which point will be known by absence of sound in the receiver $n$, the extent of such variation may be assured and determined by noting the figure on the scale 18 over the point where silence ensues. This principle is taken advantage of in the practical operation of my invention for detecting or locating metallic substances, minerals, ores, and buried treasure, and the operation is as follows: The fixed terminal A, with bridge attached, is inserted in the earth. The movable terminal A' is then inserted in the earth at a predetermined distance from A. The rod A' is connected by the wire B to the one binding-post 10 on the top of the bridge-box 11, as shown upon Figs. 1 and 2. The resistance of the earth then lying between the rods A and A' is then taken on the scale 18 and charted. Then the movable terminal A' is moved to another point on the arc of the circle and again inserted into the earth and another reading taken from the scale. This operation is repeated time and time again until the movable rod A' has been inserted into the earth at stated intervals around a complete circle, the arc of which is equally distant at all times from the fixed rod A, which forms the center of the circle, a reading of the resistance being noted in each case. Now if metals, ores, or minerals or like substances are present in the vicinity being tested then by reason of such presence the resistance of the earth at this particular point where the measurement is taken will be less than it would be if no minerals, ores, metals, or like substances were present, by reason of a well-known fact that a current will seek the path of the least resistance, and hence by comparing the measurements taken as above described the location as well as the presence of the substances above referred to will be detected and determined.

It will be observed from my construction and connections, as shown in Fig. 3, that I generate and send through the earth extra direct electrical impulses, and hence avoid electrolysis and also the effects of earth-currents.

It is obvious that many variations and changes in the details of construction and arrangements would readily suggest themselves to persons skilled in the art and still be within the spirit and scope of my invention.

It is not desired to confine this invention to the specific construction, combination, and arrangement of parts therein shown and described, and the right is reserved to make all changes in and modifications of the same as come within the spirit of this invention.

The operation of this invention will be readily understood from the foregoing description when taken in connection with the accompanying drawings.

What I claim as my invention, and desire to secure by Letters Patent, is—

The apparatus for locating metals, minerals, and ores in the earth, the fixed circuit-terminal adapted to be inserted in the earth, a box rigidly attached to said fixed terminal and containing the circuits of the Wheatstone bridge and in circuit with the branches of said bridge, in combination with another circuit-terminal independent of, and freely movable with respect to the fixed terminal; said independent terminal being adapted to be brought into contact with the earth at various and widely-separated points to close electric circuits which include the earth between the fixed and movable terminals and means for measuring the resistance of the earth portions of said circuits, as and for the purpose set forth.

In testimony whereof I have signed my name to this specification in the presence of two subscribing witnesses.

FRED HARVEY BROWN.

Witnesses:
AMELIA GUEST,
E. F. LEWYS.